United States Patent
Jing et al.

(10) Patent No.: US 6,785,784 B1
(45) Date of Patent: *Aug. 31, 2004

(54) METHOD FOR PROTECTIVE CACHE REPLACEMENT

(75) Inventors: Jin Jing, West Roxbury, MA (US); Michael Man-Hak Tso, Saratoga, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 855 days.

(21) Appl. No.: 09/000,635

(22) Filed: Dec. 30, 1997

(51) Int. Cl.[7] .............................................. G06F 12/16
(52) U.S. Cl. ..................................... 711/154; 711/148
(58) Field of Search ............................... 711/108, 148, 711/154, 170; 710/5; 709/102

(56) References Cited

U.S. PATENT DOCUMENTS

| | | | |
|---|---|---|---|
| 4,969,088 A | * 11/1990 | McAuliffe et al. .......... 711/108 |
| 5,237,673 A | * 8/1993 | Orbits et al. ................ 711/170 |
| 5,373,375 A | 12/1994 | Weldy ......................... 358/523 |
| 5,517,612 A | 5/1996 | Dwin et al. ................. 395/166 |
| 5,544,320 A | 8/1996 | Konrad ................... 395/200.09 |
| 5,673,322 A | 9/1997 | Pepe et al. ..................... 380/49 |
| 5,684,969 A | 11/1997 | Ishida ........................ 395/342 |
| 5,701,451 A | 12/1997 | Rogers et al. ............... 395/600 |
| 5,706,434 A | 1/1998 | Kremen et al. ........ 395/200.09 |
| 5,724,556 A | 3/1998 | Souder et al. ............... 395/500 |
| 5,727,159 A | 3/1998 | Kikinis ................... 395/200.76 |
| 5,742,905 A | 4/1998 | Pepe et al. ................... 455/461 |
| 5,758,183 A | * 5/1998 | Scales ............................ 710/5 |
| 5,761,729 A | * 6/1998 | Scales ........................ 711/148 |
| 5,768,510 A | 6/1998 | Gish ...................... 395/200.33 |
| 5,802,585 A | * 9/1998 | Scales et al. ................ 711/154 |
| 5,805,735 A | 9/1998 | Chen et al. .................. 382/239 |
| 5,872,972 A | * 2/1999 | Boland et al. ............... 709/102 |

OTHER PUBLICATIONS

Armando Fox and Eric A. Brewer, "Reducing WWW Latency and Bandwidth Requirements by Real–Time Distillation," Fifth International World Wide Web Conference, May 6–10, 1996.

Armando Fox et al., Adapting to Network and Client Variability via On–Demand Dynamic Distillation, University of Cal. at Berkeley, Sep. 1996.

* cited by examiner

*Primary Examiner*—David Hudspeth
*Assistant Examiner*—Fred F. Tzeng
(74) *Attorney, Agent, or Firm*—Kenyon & Kenyon

(57) ABSTRACT

A method for maintaining a common resource shared by a plurality of entities, wherein the common resource contains a plurality of entries each of which is associated with one of the plurality of entities, includes the steps of determining an amount of the common resource occupied by entries associated with a given one of the plurality of entities; and removing a number of the associated entries from the common resource to reduce the occupied amount if the occupied amount exceeds a predetermined threshold.

17 Claims, 4 Drawing Sheets

METHOD FOR PROTECTIVE CACHE REPLACEMENT

This application claims the benefit of U.S. Provisional Application Serial No. 60/041,368 titled "Method for Auto-Fetch Protective Cache Replacement," filed Mar. 25, 1997 by Jin Jing et al. and assigned to Intel Corporation, the disclosure of which is expressly incorporated herein by reference.

BACKGROUND OF THE INVENTION

1. Field of the Invention

The present invention relates generally to the field of computer networking, and in particular to a method for maintaining cache storage which relieves the cache of unnecessarily high volume and cost resulting from cache object replacements due to requests from so-called "auto-fetch" utilities.

2. Related Art

In network devices equipped with cache storage, it is common to implement a cache replacement policy based on an LRU (Least-Recently Used) technique. That is, the least recently referenced objects (or pages) in the cache are removed from storage for replacement. Some existing LRU-based policies use semantics of object sizes and types for further optimization.

Recently, so-called "auto-fetch" utilities have gained popularity with users who routinely browse the World Wide Web ("the Web"). These utilities are designed for off-line browsing, retrieving predetermined Web objects of particular interest to the user during off-line times, thereby reducing the user's on-line browsing time by ensuring the objects are already available when the user logs on. Where the user accesses the Web through a network proxy, however, auto-fetch utilities tend to have an undesirable adverse effect on a proxy cache that uses a conventional LRU-based replacement policy. Since the auto-fetch utility can continuously generate arbitrarily large numbers of requests for Web objects to the network proxy, popular objects (or pages) for the majority of so-called "normal" users (that is, those not using auto-fetch utilities) are replaced by those objects requested by auto-fetch utilities. As a result, normal users may experience longer visible latencies than they otherwise would, due solely to the abnormally large volumes of cache objects attributable to auto-fetch requests. Moreover, the problem is not limited to network proxies. The same problem can arise on a network server, such as a content server, which serves large numbers of users. Again, so-called "normal" users may experience degraded performance when accessing such a server due to inordinate resource demands of auto-fetching utilities.

In view of the increased popularity of auto-fetch utilities, there is a need for a method of ensuring that users of such utilities do not unfairly monopolize shared cache resources to the detriment of other users.

SUMMARY OF THE INVENTION

According to an embodiment of the present invention, a method for maintaining a common resource shared by a plurality of entities, wherein the common resource contains a plurality of entries, each of which is associated with one of the plurality of entities, includes determining an amount of the common resource occupied by entries associated with a given one of the plurality of entities. A number of the associated entries are removed from the common resource to reduce the occupied amount if the occupied amount exceeds a predetermined threshold.

According to another embodiment of the present invention, a method for maintaining a cache storage resident in a network device coupled to a plurality of client devices, wherein the cache storage contains a plurality of cached objects, includes determining an amount of cache resource occupied by cached objects associated with a given client device. A number of those cached objects are removed from the cache storage to reduce the amount of occupied cache resource if the amount exceeds a predetermined threshold.

DETAILED DESCRIPTION

It is known in the field of computer networking for a group of client devices to access network resources through a common interface, such as a network proxy. It is further known for such network proxies to be equipped with a cache storage to reduce user-visible latencies when retrieving network objects that have previously been retrieved. An example of one such cache-equipped network proxy, implemented as a transcoding server, is illustrated schematically in FIG. 1.

Figure 1:
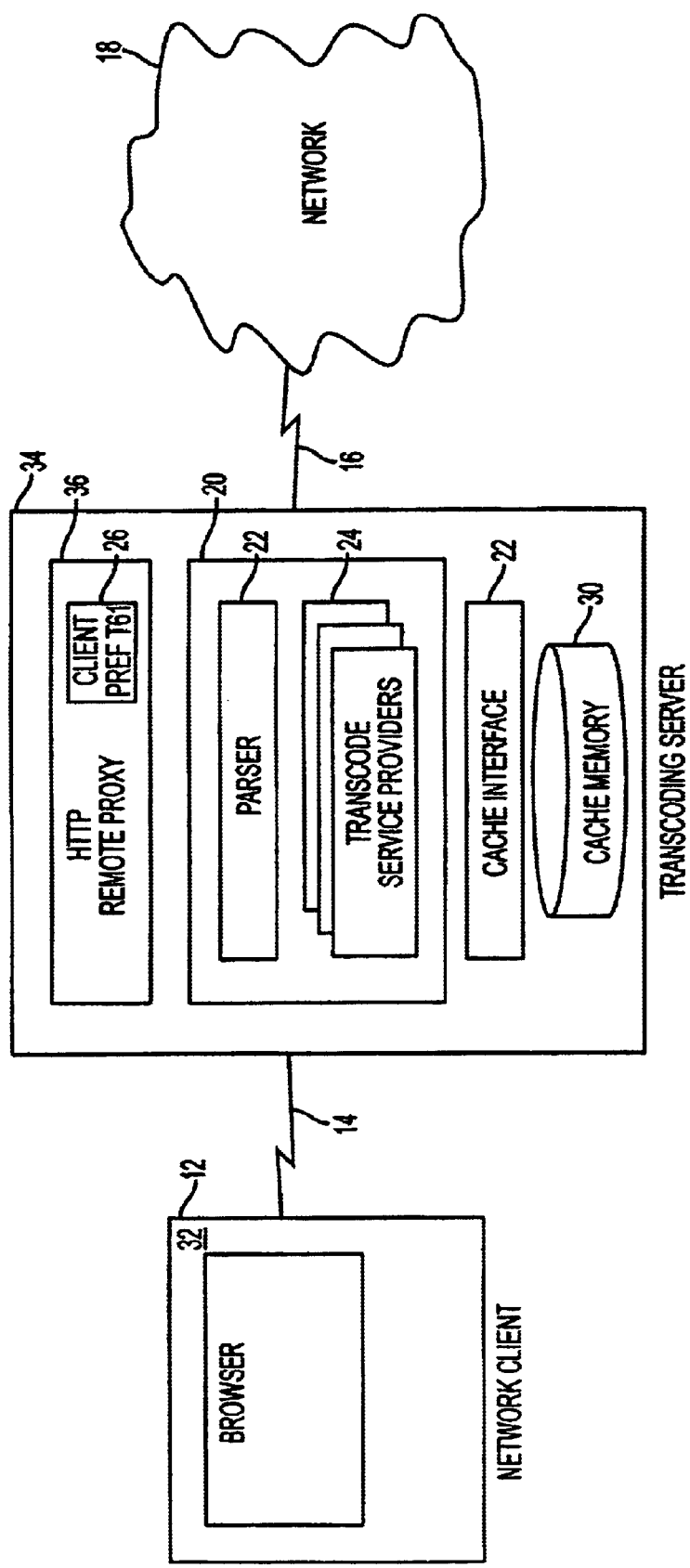
FIG. 1 is a schematic diagram illustrating a transcoding server of a type to which embodiments of the present invention may be applied.

Referring now to FIG. 1, a transcoding server 34 manages the transfer of data from a network 18, such as the Internet, to a network client 12. Network client 12 may be any computer having suitable data communications capability. Network client 12 communicates requests for information to, and receives information from, network server 10 over a client/server communications link 14. Transcoding server 34 in turn communicates with computers resident on network 18 through server/network communications link 16. The respective communications links 14, 16 may comprise any suitable communications media known in the art.

Transcoding server 34 may comprise, or be a part of, a network server, a stand-alone computer in communication with a network server, or a distributed system of computers. Transcoding server 34 may be coupled, for example, to an ISP's network, a corporate network, or anywhere on network 18, and may provide multiple users (i.e., clients) with a means to obtain content on network 18.

Transcoding server 34 includes a transcoder 20 having a parser 22 and a plurality of transcode service providers 24. Parser 22 is configured to act upon data received by transcoder 20, such as a request for a network object generated by a client device or a reply to such a request provided by a content server device. In this particular arrangement, parser 22 is responsible for selectively invoking one or more of transcode service providers 24 based upon a predetermined selection criterion.

In this particular arrangement, transcoding server 34 also includes an HTTP (HyperText Transfer Protocol) remote proxy 36, capable of accessing network 18 over server/ network communications link 16. HTTP remote proxy 36 differs from known network proxies, which generally are little more than a conduit for requests to, and replies from, external Internet resources, in that it is capable not only of examining such requests and replies, but also of acting upon commands in the requests by, for example, determining whether or not to transcode content. Moreover, using transcoder 20, HTTP remote proxy 36 is capable of changing content received from network 18 prior to returning it to a requesting network client 12, as is explained further below.

Looking more closely at the arrangement in FIG. 1, transcoder 20 is coupled to HTTP remote proxy 36. Parser 22 manages the transcoding of data to be transmitted from transcoding server 34 to network client 12. To this end, parser 22 controls transcode service providers 24 to selectively transcode content based on a predetermined selection criterion. In this context, the term "transcode" refers to virtually any type of addition, deletion, modification or other manipulation of data. For example, one or more transcode service providers 24 may provide the capability to compress and/or scale different types of data content, such as image, video, or HTML (HyperText Markup Language).

Parser 22 may comprise a relatively simple, uniform interface to HTTP remote proxy 36, and may provide an API (Application Programming Interface) for transcoding data received by HTTP remote proxy 36. Parser 22 manages one or more transcode service providers 24 that are accessed through a common SPI (Service Provider Interface). In this particular embodiment, parser 22 is designed in compliance with the Windows Open Systems Architecture (WOSA), and may be implemented as a Win32 DLL (Dynamic Link Library). The WOSA architecture, described in *Readings on Microsoft Windows and WOSA* (Microsoft Corp. 1995), enables additional transcode service providers 24 to be dynamically added to the system to provide new features and/or better transcoding algorithms, while at the same time not requiring changing or retesting other software components in the system.

As shown in FIG. 1, transcoding server 34 may also include a server-side cache memory 30 managed by a server-side cache interface 28. Server-side cache memory 30 may be used to store both original and transcoded versions of content for later transmission to network client 12 without the need to re-retrieve the content from network 18 or to re-transcode the content. Like parser 22, server-side cache interface 28 may be modeled after a standard Get/Set interface. Server-side cache memory 30 essentially "owns" all cached objects, in that it manages the properties and storage of the objects and may invalidate any non-locked object at any time; however, the actual format of any given cached object is known only by parser 22 and its associated transcode service providers 24. Thus, for data integrity and transcoding efficiency purposes, all access to server-side cache memory 30 in this arrangement is through parser 22.

Server-side cache interface 28 may include the following calls:
CreateEntry(URL, &Entry, . . . );
GetEntry(URL, &Entry);
CreateStream(Entry, &StreamEntry, . . . );
GetStream(Entry, &StreamEntry, . . . );
CloseEntry(Entry);
CloseStreamEntry(StreamEntry);
GetProperties(Entry, &Properties, . . . );
SetProperties(Entry, &Properties, . . . );
Read(StreamEntry, &OutStream, . . . );
Write(StreamEntry, &InStream, . . . ).
Unlike most cache memories, server-side cache interface 28 and server-side cache memory 30 enable maintenance of multiple representations of a given cached object, with descriptive information about each representation included in server-side cache memory 30. In addition, server-side cache interface 28 and server-side cache memory 30 serve as a synchronization point for multi-threaded accesses to cached objects. It should be noted that the illustrated arrangement does not require any particular configuration for server-side cache interface 28 and/or server-side cache memory 30. Indeed, functionality attributed to these components may be readily implemented in other system components.

The CreateEntry( ) call creates and returns a cache entry for a specified hypertext object. This call also creates an entry stream for an original version of the hypertext object. Similarly, the GetEntry( ) call obtains a cache entry for a hypertext object already existing in cache memory 30. Both the CreateEntry( ) and GetEntry( ) calls set locks on associated cached objects until a CloseEntry( ) call is invoked. Once a lock is set, the cached object will not be replaced or invalidated by cache interface 28, permitting one or more transcode service providers 24 to safely perform any required cache operations, such as object retrieval and/or storage.

After a cache entry is created or opened by a CreateEntry( ) or GetEntry( ) call, the CreateStream( ) or GetStream( ) calls may respectively create or open an extra stream entry for the cached object. Each extra stream entry is associated with a different transcoded version of the hypertext object, which may be retrieved or appended to by one of transcode service providers 24. Stream-based processing of cached objects makes it possible for transcoding server 34 to begin transmitting a transcoded version of a hypertext object to a requesting network client 12 even while transcode service provider 24 is appending additional transcoded content to that same version. Advantages of this stream-based processing include reducing user latency through incremental painting of objects and avoiding unnecessary idle time on client/server communications link 14, thereby providing users with a more responsive "feel."

The GetProperties( ) and SetProperties( ) calls retrieve and store information about cached objects, including information maintained by transcode service provider 24 used to determine transcoding properties and transcoding status of a cached object. Transcode service provider 24 may use such information, for example, to determine current compression progress for scaled data access and staged refinements.

The Read( ) call reads data from a specified cached object data stream. For example, transcode service provider 24 may invoke this call and tunnel stream data through HTTP remote proxy 36 directly to network client 12. The Write( ) call caches data from a new HTTP data stream. This call will append an incoming data stream received from, for example, a Web server or transcode service provider 24, to an opened cache stream which may be concurrently read using the Read( ) call.

To further illustrate the operation of the arrangement shown in FIG. 1, parser 22 may include the following calls:
GetObject(URL, InParams, &OutParams, &OutStream, . . . );
GetScaledObject(URL, InParams, &OutParams, &OutStream, Stage, . . . );
PutObject(URL, InParamStruct, &InStream, &OutParams, &OutStream, . . . ).
As detailed below, parser 22 uses these calls to manage the provision of requested content to network client 12.

The GetObject( ) call is used to service non-enabled client requests, and returns a non-transcoded (i.e., original) version of a specified hypertext object. In this embodiment, transcoding server 34 assumes that each HTTP request has a unique thread that may be blocked until the request is satisfied. Accordingly, the GetObject( ) call will block until it either returns the requested data stream or indicates failure with a cause (e.g., object does not exist). This ability to return a so-called standard hypertext object is advantageous for compatibility reasons, enabling embodiments of the present invention to be used with existing browsers that do not include support for certain transcoding functionality (e.g., advanced data compression), and enabling users to selectively retrieve non-transcoded versions.

The GetScaledObject( ) call is similar to GetObject( ), and is also used to request an object from server-side cache memory 30; however, it adds support for requesting a particular version of that object, such as a high-quality rendition. Unlike traditional caching proxies, transcode service providers 24 can use server-side cache memory 30 to store several different versions of an object to support clients with different communications and/or presentation capabilities. Thus, an additional "Stage" parameter may be used to indicate which version of the cached object is to be returned to network client 12. Where transcode service provider 24 is configured to scale network content, it may use this parameter to request a version of a cached object having, for example, a default scaled quality, a refinement to a better-quality version, or the original non-scaled version.

In this arrangement, when network client 12 requests a hypertext object, HTTP remote proxy 36 uses either the GetObject( ) or GetScaledObject( ) call (depending on if network client 12 is capable of receiving scaled/transcoded datatypes) to retrieve the hypertext object from parser 22. If the hypertext object is not found, parser 22 uses the CreateEntry( ) call to create an entry (in effect, a placeholder) in server-side cache memory 30 for the new object. The new entry is returned to HTTP remote proxy 36, which requests the hypertext object from Internet 18. As a data stream for the hypertext object is returned, HTTP remote proxy 36 calls parser 22 using the PutObject( ) call, passing into this call the new entry and the handle to the data stream to be placed into the entry. Parser 22 selects an appropriate transcode service provider 24 based, for example, on the content type of the data stream. In this context, the term content type encompasses a datatype, an HTTP MIME (Multipurpose Internet Mail Extensions) type, a content format, and so on. The selected transcode service provider 24 uses a separate thread to read the incoming data stream, transcode it, and place it within the entry of server-side cache memory 30. The current thread immediately returns to HTTP remote proxy 36, which once again calls GetScaledObject( ) (or GetObject( )). This case will always result in a cache hit. This thread then works simultaneously with the separate thread in the PutObject( ) to tunnel data (either original or transcoded) from transcoding server 34 to network client 12.

Multiple-thread processing can be used to improve the efficiency of the illustrated arrangement by not waiting for a hypertext object to be received in its entirety by HTTP remote proxy 36, or added in its entirety to server-side cache memory 30, before beginning to send the object to network client 12. Another benefit of multiple-thread processing is that parser 22 may efficiently process requests for the same hypertext object from multiple network clients 12. The hypertext object need only be retrieved from network 18 once, and appropriate versions may be transmitted to such multiple network clients 12 concurrently.

Figure 2:
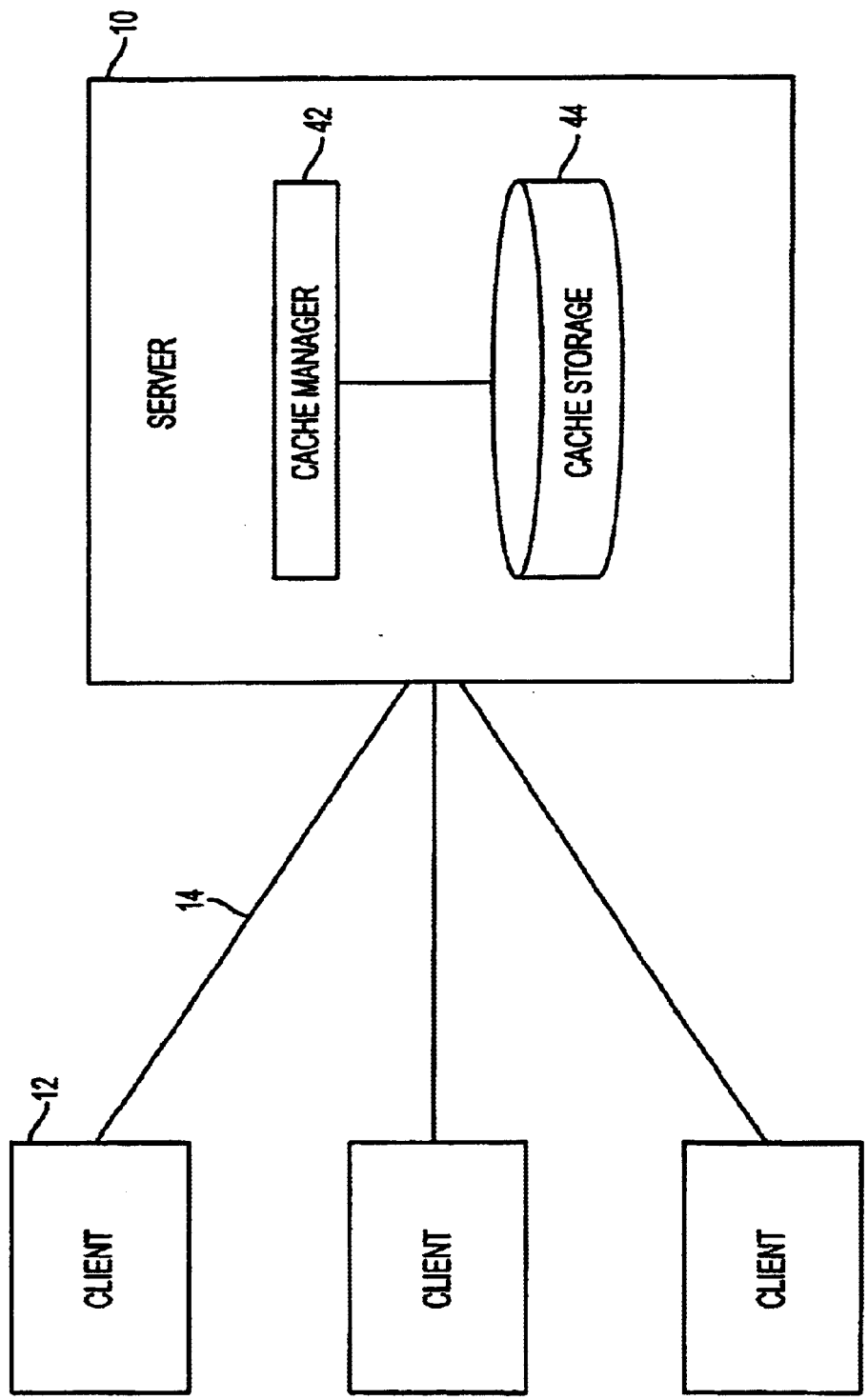
FIG. 2 is a schematic diagram illustrating an embodiment of the present invention.

Referring now to FIG. 2, according to a first embodiment of the present invention, a network device 10 may be coupled to a plurality of network clients 12 through a communications link 14. Network device 10 may comprise, for example, a transcoding server of the type illustrated in FIG. 1; however, the present invention is not limited in this regard. Embodiments of the present invention may be advantageously implemented in any type of device configured to provide cache functions to a plurality of other devices, including a network proxy or even a client device. Moreover, in alternate embodiments (discussed further below), network device 10 may be replaced by, for example, a microprocessor, an operating system, or any other hardware-based or software-based device providing a resource shared by a number of other entities. In such alternate embodiments, client devices 12 might be replaced, for example, by applications or processes accessing the shared resource.

In the embodiment shown in FIG. 2, network device 10 includes a cache manager 42 coupled to a cache storage 44. Cache manager 42 may comprise, for example, a software module programmed to manage all cache-related operations for network device 10, such as adding objects to and retrieving objects from cache storage 44. With reference to the arrangement shown in FIG. 1, cache manager 42 and cache storage 44 may be implemented as cache interface 28 and cache memory 30 respectively. In existing devices, cache manager 42 will typically also be responsible for implementing some form of cache replacement policy to promote optimum use of cache storage 44.

Figure 3:
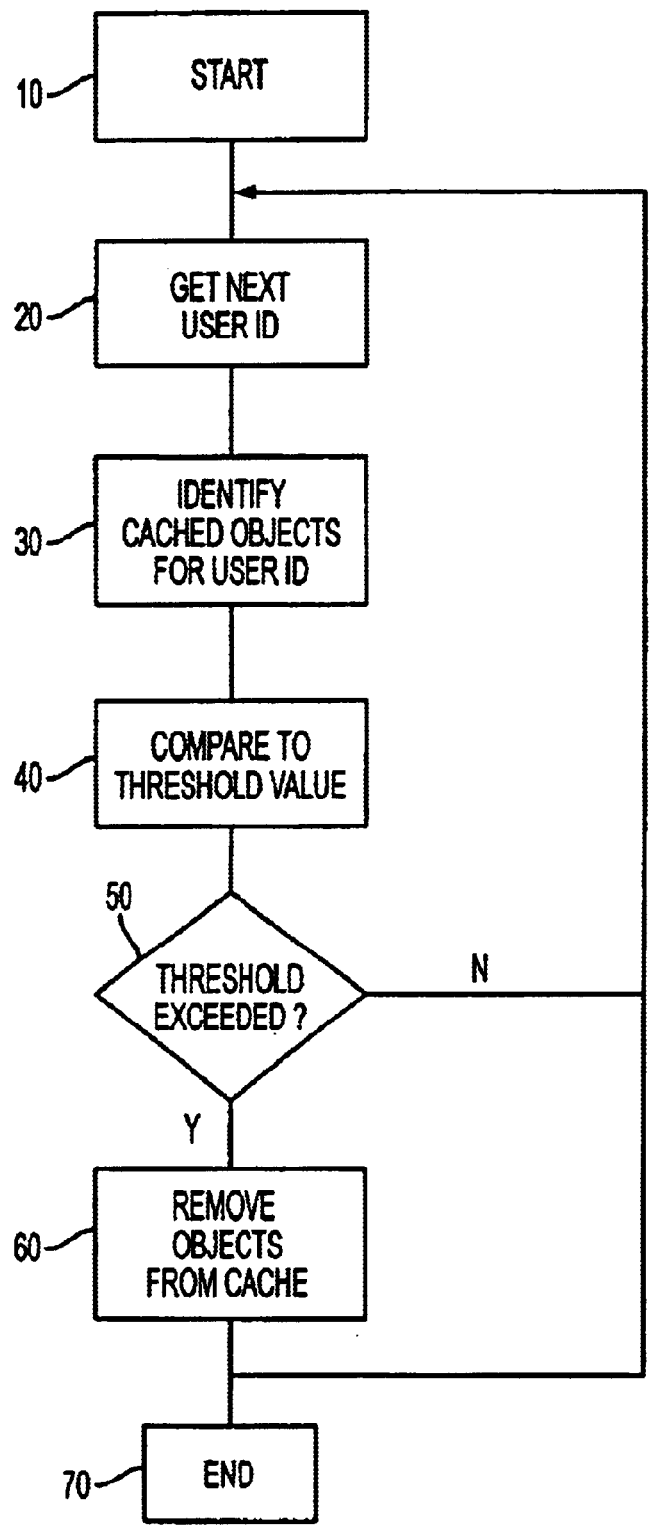
FIG. 3 is a flow diagram describing a method for maintaining a cache storage according to an embodiment of the present invention.

FIG. 3 provides a flow diagram illustrating a method for implementing a protective cache replacement policy according to an embodiment of the present invention. With reference to the structures illustrated in FIG. 2, for example, the method of this embodiment is generally directed to ensuring that popular data objects are not forced out of cache storage 44 by large numbers of objects being placed into cache storage 44 solely as a result of requests generated by auto-fetch utilities. To do so, the permissible number of cached objects designated as having been last referenced by any given user is limited to a predetermined threshold. If the number of cached objects associated with any single user exceeds that threshold, a number of such cached objects sufficient to bring the count below the threshold are removed from cache storage. In addition, if the number of cached objects associated with all users is below the threshold, then a standard cache replacement policy, such as an LRU-based policy, may be used. The overall cache replacement policy is therefore effectively able to give low priority to objects that have been most recently scanned by an auto-fetch utility.

Looking more closely at the embodiment of FIG. 3, the cache replacement policy may be based upon user IP (Internet Protocol) address information. Where, for example, the embodiment is implemented in a network device 10 such as that illustrated in FIG. 2, cache manager 42 would interrogate the objects resident in cache storage 44 to count the number of such objects referenced by each user (identified, for example, by IP address), and ensure that the number does not exceed a predetermined threshold (Steps 20–50). If the number of cached objects associated with a given user exceeds the predetermined threshold, some or all of those cached objects may be removed from cache storage 44 (Step 60). For example, it is possible to remove only a number of cached objects sufficient to bring the total number for that user down to or below the predetermined threshold.

It should be noted that the embodiment just described implements only one possible definition of "fairness" with respect to sharing cache storage 44; however, embodiments of the present invention may be readily adapted to implement any number of other fairness policies. For example, in some applications it may be desirable to grant specified users so-called "VIP" status, wherein such users are able to use a greater portion of the shared resource than others. Such approaches may be especially useful for embodiments where the "users" are applications and the shared resource is a microprocessor cache, in which case it is desirable to grant critical applications higher priority.

In accordance with embodiments of the present invention, cache manager 42 to log with each entry for a cached object an IP address for the user that caused that cached object to be placed into cache storage 44 (or who most recently retrieved the object from cache storage 44). These IP addresses are typically extracted from the header portion of a network data packet containing a user request for the object. Where the proxy cache already uses an LRU-based policy, cache manager 42 will typically also maintain an "LRU list" containing all or some predetermined number of cache entries (identified, for example, by URL (Uniform Resource Locator)) stored in cache storage 44 in least-recently accessed to most-recently accessed order.

Figure 4:
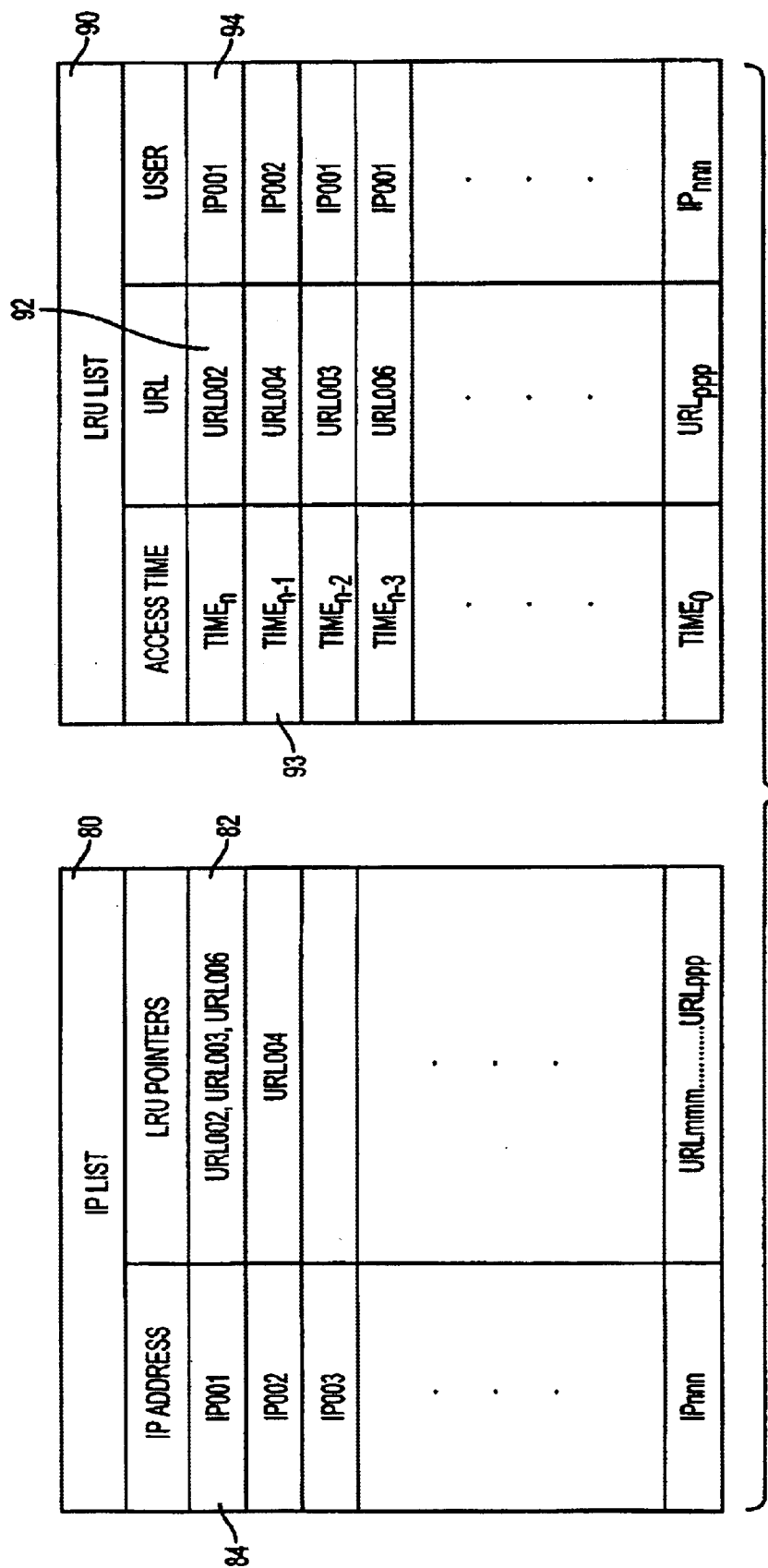
FIG. 4 is a schematic diagram illustrating data structures which may used in connection with an embodiment of the present invention.

Referring now to FIG. 4, in another embodiment of the present invention cache manager 42 may be configured to dynamically generate an IP list 80 containing entries with IP addresses 84 for each of the different IP addresses 94 in an LRU list 90. IP list 80 may also include pointers 82 for each IP address 84 identifying all of the associated entries in LRU list 90. IP list 80 may need to be dynamically constructed by cache manager 42, whereas LRU list 90 is typically an existing structure maintained by cache manager 42.

Once constructed, IP list 80 may be sequentially processed to determine a number of URLs 92 in cache storage 44 associated with each IP address 84. If the number of URLs 92 for a given IP address 84 exceeds a predetermined threshold value, such as 1000, cache manager 42 may cause some or all of the URLs 92 associated with that IP address 84 to be purged (or replaced) from cache storage 44. Where cache storage 44 services an extremely large number of users, the size of IP list 80 (that is, the number of different IP addresses) may be limited to a fixed constant for performance reasons. In other words, IP list 80 may be limited to some fixed number of IP addresses 84 for users who most recently accessed cache storage 44, and the protective cache replacement policy would operate only on cached objects associated with that fixed number of IP addresses 84. Indeed, IP list 80 may itself be the subject of a replacement policy similar to that applied to cache storage 44, in that entries for a predetermined number of the least recently entered IP addresses 84 may be removed.

The method of the above-described embodiment may be implemented, for example, through software instructions included in a routine responsible for maintaining cache storage. Such an approach differs from that typically used to implement a cache replacement policy through either hardware architecture (for example, a microprocessor cache) or system software (for example, an operating system's working set which uses an LRU policy), which do not use program-level information to make cache replacement decisions. These existing cache replacement approaches are typically based on access frequencies (for example, least-frequently used) or access orders (for example, first-in/first-out or least-recently used).

According to an alternate embodiment of the present invention, cache manager 42 may be configured to selectively execute a protective cache replacement policy such as that described above upon detection of a predetermined condition. Such a predetermined condition may be, for example, a system parameter associated with cache resource availability, such as a percentage of the total cache resources currently in use. Alternatively, the cache replacement procedure may be executed periodically, executed in background during idle times, or executed whenever an attempt by cache manager 42 to add an object to cache storage 44 fails due to a lack of available space.

In yet another embodiment of the present invention, a protective cache replacement policy may be implemented to avoid monopolization of cache resources by an entity identified according to a predetermined selection criterion. In the embodiments discussed above, the protective cache replacement procedure tracked the number of cached objects associated with particular users (that is, IP addresses). In some implementations, it may be desirable to track the number of cached objects associated with a group of users, such as all users associated with a particular company or sub-division of a company, or all users accessing a proxy cache through a particular server or network proxy computer. Virtually any available means for identifying users may be employed as the selection criterion.

Application of protective cache replacement methods such as those described above is not limited to only networking applications. For example, it is known in the field of computer design to provide a microprocessor with at least one cache to enhance system performance. Such microprocessor systems typically lack any type of protective cache replacement method. Thus, as in the situations described above, it is possible for a single "user" (in this context, an application or process) to monopolize cache resources to the detriment of other users. Worse still, if more than one application attempts to monopolize the cache, a condition known as "thrashing" may arise. Thrashing occurs when two different applications are actively displacing each other's data from the cache, with the result that neither application is able to obtain significant benefit from the cache. Similar situations are found in operating systems (OS) which use a combination of RAM (Random Access Memory) and less-expensive disk storage to implement virtual memory (VM). In such systems, the OS typically uses RAM to cache blocks of data from the disk storage because RAM offers much faster access. Since RAM is shared by all applications running on the computer, however, thrashing may occur just as in microprocessors.

In view of the foregoing, embodiments of the present invention may be advantageously applied to other types of caching environments, including microprocessors and operating systems, where a cache resource is shared among a number of different entities. With reference to FIG. 4, such alternate embodiments may be implemented using data structures very similar to those described with respect to the network-related embodiments. For example, a user list (or application list, process list, etc.) and a shared resource list may be used in place of IP list 80 and LRU list 90, respectively, to implement a protective replacement policy by tracking the extent to which each user is occupying the shared resource. In such an embodiment, for example, IP addresses 84, 94 may be replaced by application or process IDs. Likewise, URLs 92 and URL pointers 82 may be replaced by appropriate identifiers referencing particular addresses (for example, page number, block ID) or entries within the shared resource.

Embodiments of the present invention may be distributed, for example, as a set of instructions residing on a storage medium. Such a storage medium might be a memory of a computer; a piece of firmware; a portable storage device, such as a diskette or other magnetic storage device, or a CD-ROM; or any other medium on which it is known to store executable instructions.

The foregoing is a detailed description of particular embodiments of the present invention. The invention embraces all alternatives, modifications and variations that fall within the letter and spirit of the claims, as well as all equivalents of the claimed subject matter. For example, embodiments of the present invention may be applied to any type of cache used by a network client device. Likewise, the benefits of such embodiments are not limited to auto-prefetchers, but rather to any type of automated fetching tool capable of generating large numbers of cached objects. Persons skilled in the art will recognize from the foregoing detailed description that many other alternatives, modifications and variations are possible.

What is claimed is:

1. A method for maintaining a cache storage of a network device coupled to a plurality of client devices capable of downloading objects, said method comprising the steps of:
   in a cache storage containing a plurality of cached objects, determining an amount of cache resource occupied by cached objects associated with each of a plurality of client devices, wherein each cached object is associated with at least one client device that downloaded the cached object; and
   removing cached objects from the cache storage to ensure that the amount of cache resource occupied by cached objects associated with any given client device does not exceed a predetermined threshold.

2. The method of claim 1, wherein said amount of occupied cache resource comprises a count of said cached objects associated with a given client device.

3. The method of claim 1, wherein said amount of occupied cache resource further comprises a percentage of the cache storage occupied by said cached objects associated with a given client device.

4. The method of claim 1, wherein said cached objects associated with a given client device correspond to objects in the cache storage for which said given client device is identified as having most recently acted upon said cached object.

5. The method of claim 1, further comprising the step of identifying a predetermined number of client devices that most recently acted upon an object in the cache storage, wherein said steps of determining an amount of cache resource and removing cached objects from the cache storage are performed for each of said predetermined number of client devices.

6. The method of claim 1, wherein said method is performed in response to a predetermined condition.

7. The method of claim 6, wherein said predetermined condition comprises expiration of a time interval.

8. The method of claim 6, wherein said predetermined condition comprises a system parameter associated with cache resource availability.

9. The method of claim 1, wherein said steps of determining an amount of cache resource and removing cached objects from the cache storage are performed for each of a group of client devices satisfying a predetermined selection criterion.

10. The method of claim 9, wherein said predetermined selection criterion comprises an identifier for a network proxy through which said client devices access the network device.

11. A cache manager for a network device coupled to a plurality of client devices capable of downloading objects, wherein said cache manager manages a cache storage containing a plurality of cached objects, each of which is associated with at least one client device that downloaded it, said cache manager comprising instructions for determining an amount of cache resource occupied by cached objects associated with each of a plurality of client devices, and removing cached objects from the cache storage to ensure that the amount of cache resource occupied by cached objects associated with any given client device does not exceed a predetermined threshold.

12. The cache manager of claim 11, further comprising instructions for limiting a number of objects stored in the cache storage as a result of having been most recently acted upon by a given one of said plurality of client devices.

13. A storage medium containing a set of instructions for execution by a network device coupled to a cache storage including a plurality of cached objects, wherein each of said cached objects is associated with at least one of a plurality of client devices that downloaded it, said set of instructions comprising instructions for:
   in a cache storage containing a plurality of cached objects, determining an amount of cache resource occupied by cached objects associated with each of a plurality of client devices, wherein each cached object is associated with at least one client device that downloaded the cached object; and
   removing cached objects from the cache storage to ensure that the amount of cache resource occupied by cached objects associated with any given client device does not exceed a predetermined threshold.

14. The storage medium of claim 13, wherein said cached objects associated with a given client device comprise objects in the cache storage for which said given client device is identified as having most recently acted upon said cached object.

15. The storage medium of claim 13, wherein said set of instructions further comprises instructions for determining an amount of occupied cache resource and removing cached objects for each of a predetermined number of client devices.

16. The storage medium of claim 13, wherein said storage medium comprises a magnetic storage device.

17. The storage medium of claim 13, wherein said storage medium comprises a memory of the network device.

* * * * *